United States Patent [19]

Ulrich

[11] Patent Number: 4,803,719
[45] Date of Patent: Feb. 7, 1989

[54] METHOD FOR POWERING TELEPHONE APPARATUS AND TELEPHONE APPARATUS POWERED DIRECTLY FROM THE TELEPHONE LINE WITHOUT EXTERNAL POWER

[76] Inventor: Thomas J. Ulrich, 14 Brookfield Rd., Binghamton, N.Y. 13903

[21] Appl. No.: 58,253

[22] Filed: Jun. 4, 1987

[51] Int. Cl.⁴ .......................................... H04M 19/00
[52] U.S. Cl. ..................................... 379/399; 379/413
[58] Field of Search .............. 379/156, 387, 413, 441, 379/442, 399

[56] References Cited

U.S. PATENT DOCUMENTS

| | | | |
|---|---|---|---|
| 3,336,521 | 8/1967 | Russell | 363/24 |
| 4,030,014 | 6/1977 | Chana et al. | 363/24 |
| 4,254,459 | 3/1981 | Belson | 363/24 |
| 4,380,687 | 4/1983 | Stewart | 379/64 |
| 4,395,590 | 7/1983 | Pierce et al. | 379/442 X |

OTHER PUBLICATIONS

"Designer's Casebook", Electronics, Apr. 12, 1971; by Stig R. Hjorth.
"Understand FCC Rules when Designing Telecomm Equipment"; EDN, May 16, 1985, Glen Dash, Dash, Straus and Goodhue Inc.
"IC-Modem/Phone-Network Interfaces Meet FCC Isolation, Protection Rules", EDN, Mar. 22, 1984, R. Chirayil and P. Ehlig.
"Single-Chip Repertory Dialer Affords Dual-Dial—Mode Telephone", EDN, Mar. 22, 1984, Darin L. Kincaid and David N. Larson.
General Digital Corporation, GEN-II Pay Telephone, 1985.

Primary Examiner—Steven Mottola
Attorney, Agent, or Firm—Parkhurst, Oliff & Berridge

[57] ABSTRACT

A telephone apparatus powered directly from the telephone lines without external power includes a current converter in which current from a telephone line is limited by a transistor, current-sense resistor, and optical coupler acting together as a constant current device. This limited current is then converted from direct current (d.c.) to alternating current (a.c.) at the primary of a current transformer by power switching transistors driven by a flip-flop which is in turn driven by a free-running constant frequency oscillator. The alternations are symmetrical and their period or timing controlled so the current transformer does not saturate, thus maintaining maximum efficiency of conversion. The transformer outputs, after being rectified and filtered, are isolated from the primary, and provide d.c. current to maintian the charge on a battery across one output and to power telephone circuitry within a telephone device connected to the d.c. outputs. An optical coupler acting as an isolated current switch turns the constant current device off and on to facilitate pulse dialing. The current converter boosts the low telephone line current to a higher current or voltage for use by telephone devices such as pay phones, key phones, modems, or other telephone line connected devices.

25 Claims, 4 Drawing Sheets

METHOD FOR POWERING TELEPHONE APPARATUS AND TELEPHONE APPARATUS POWERED DIRECTLY FROM THE TELEPHONE LINE WITHOUT EXTERNAL POWER

FIELD OF THE INVENTION

This invention relates to telephone apparatus powered directly from the telephone line without external power sources, and to methods of powering such telephone apparatus.

BACKGROUND OF THE INVENTION

Devices such as the home telephone derive their electrical current needs from the telephone line. As telephone devices become more complicated, their electrical current needs increase until they can no longer be served by the limited current available from a telephone line. Also, FCC regulations have established stringent criteria for connection of devices to the telephone network. These criteria require, among other things, that the device must operate with as little as 20 milliamperes based on the range of voltage supplied by the telephone company, the range of telephone line impedance and the required off-hook device impedance. Thus, auxiliary power derived from available power lines, usually 110-volts a.c. in the United States, is often utilized. Examples of such devices requiring auxiliary power are key telephones for businesses or pay telephones owned by telephone companies, vending companies, or private individuals and businesses. In addition, several sophisticated home telephone products have recently been introduced containing microprocessor circuitry providing varied features.

The use of auxillary power has many disadvantages. It encourages inefficient design of devices that operate over telephone lines resulting in increased operating costs for the a.c. power consumed. Installation costs are also increased due to the need for costly skilled labor to install the device and because the device may be located far from a power line or otherwise inconveniently located for such connection. Also, hazardous conditions may occur due to the potential for electrical shock and tampering by unauthorized persons. Indeed, the abovementioned FCC regulations also expressly prohibit placement of hazardous voltages or currents on the telephone line.

In addition, some devices, such as pay telephones, may depend so completely on the availability of auxiliary power that they become inoperable in the event of a power outage, loss, or failure. Thus, in an emergency situation where power is out, a telephone so affected would be unavailable for reporting the emergency. Also, memory devices within the telephone device which are dependent on the auxiliary power would lose their contents and, as a result, would require additional servicing when power is resumed. This will result in higher maintenance costs and loss of use of the device until it can be serviced.

Previous failed attempts to power devices directly from the telephone line without auxiliary power have used current limiting devices connected to the telephone line in combination with common switching regulators for each output voltage required. This approach has not proved successful due to the limited efficiency of switching regulators (on the order of 60-75%), and their inability to operate over the entire range of telephone company supply voltages, currents and line impedances. In addition, by using this approach, no electrical isolation is provided between the telephone line and the telephone circuitry.

SUMMARY OF THE INVENTION

Telephone apparatus constructed in accordance with the present invention, such as a pay telephone, key telephone, modem or other device, includes a current-to-current converter/isolator which derives all of its power needs directly from the telephone lines it serves. The present invention provides an electrically isolated output current which is proportional to the input current and the turns ratio of an isolation transformer.

The telephone line requires 20 milliamperes minimum current drain to actuate the relay in the telephone company central office when a telephone is taken off-hook. If, for example, the telephone circuitry within the telephone device requires 60 milliamperes of current for its operation, an isolation transformer having primary turns that are three times the number of secondary turns would be used. In order to insure that no more or less than the required amount of current is used, a constant current device is inserted between the current converter and the telephone line. A signal to turn the constant current device off and on is provided by the telephone device so that pulse dialing may be accomplished by control lines connected to the telephone circuitry.

A secondary winding of the transformer provides the main power to the telephone circuitry. A storage battery may be connected to this output to provide a fixed voltage to the circuitry immediately upon demand and to perpetually supply power for memory devices and the like in the telephone circuitry. Excess current from this winding is used by the battery to maintain its charge. Since the current is limited, the battery is never excessively charged. If a battery is not required, as in some telephone devices, a shunt regulator such as a zener diode may be used.

More than one voltage may be needed by the telephone circuitry. For example, the escrow relay in a pay telephone requires a substantial voltage pulse for actuation, on the order of 115 volts d.c. which is typically discharged from a 50 microfarad capacitor. A second secondary winding may be used to charge the escrow relay capacitor when the telephone is taken off-hook. The charge time of the escrow relay capacitor when powered by the present invention is approximately two seconds, and no more power is needed thereafter by the escrow relay capacitor until it fulfills its function. A third voltage may be needed to power certain telephone circuits, for example, audio circuits for a speaker. This may be provided by a third secondary winding on the current transformer. The ratio of turns and currents remain the same for each winding. The number of primary turns times the primary current equals the sum of the secondary turns times their respective output currents, and the magnitudes of the voltages on all windings are controlled by the magnitude of the voltage of the battery or shunt regulator connected to the first secondary winding and the respective turn ratios.

The input current from the telephone line is a direct current. This direct current is converted to an alternating current after passing through the current limiting device and before being applied to the primary of the transformer. The output(s) of the transformer are appropriately rectified and filtered to convert the alternating current back into a direct current. Power switching devices such as transistors are used to alternately switch the d.c. input current from one side of a split primary winding of the transformer to the other. These power switching devices are driven by a constant frequency master oscillator and device driver. It is essential for providing highly desirable low noise generation and maximum efficiency to maintain perfect symmetry between the alternations. To attain this end, the device driver uses two flip-flops. A master oscillator comprised of a first flip-flop drives the clock input of a second flip-flop which is connected so that the outputs of the second flip-flop alternate with each clock pulse applied to the clock input. The master clock remains relatively stable in frequency and symmetry, and the output symmetry of the second flip-flop is therefore substantially perfect.

It is thus a primary object of the invention to provide a telephone apparatus powered directly from the telephone line with no external power under all line conditions.

Another object of the invention is to provide telephone apparatus for powering devices directly from the telephone line with no external power while also maintaining electrical isolation between the telephone line and the telephone circuitry being powered.

These and other objects, features and advantages of the present invention will become apparent to those skilled in the art from the following detailed description with reference to the drawings.

DESCRIPTION OF THE PREFERRED EMBODIMENT

Figure 1:
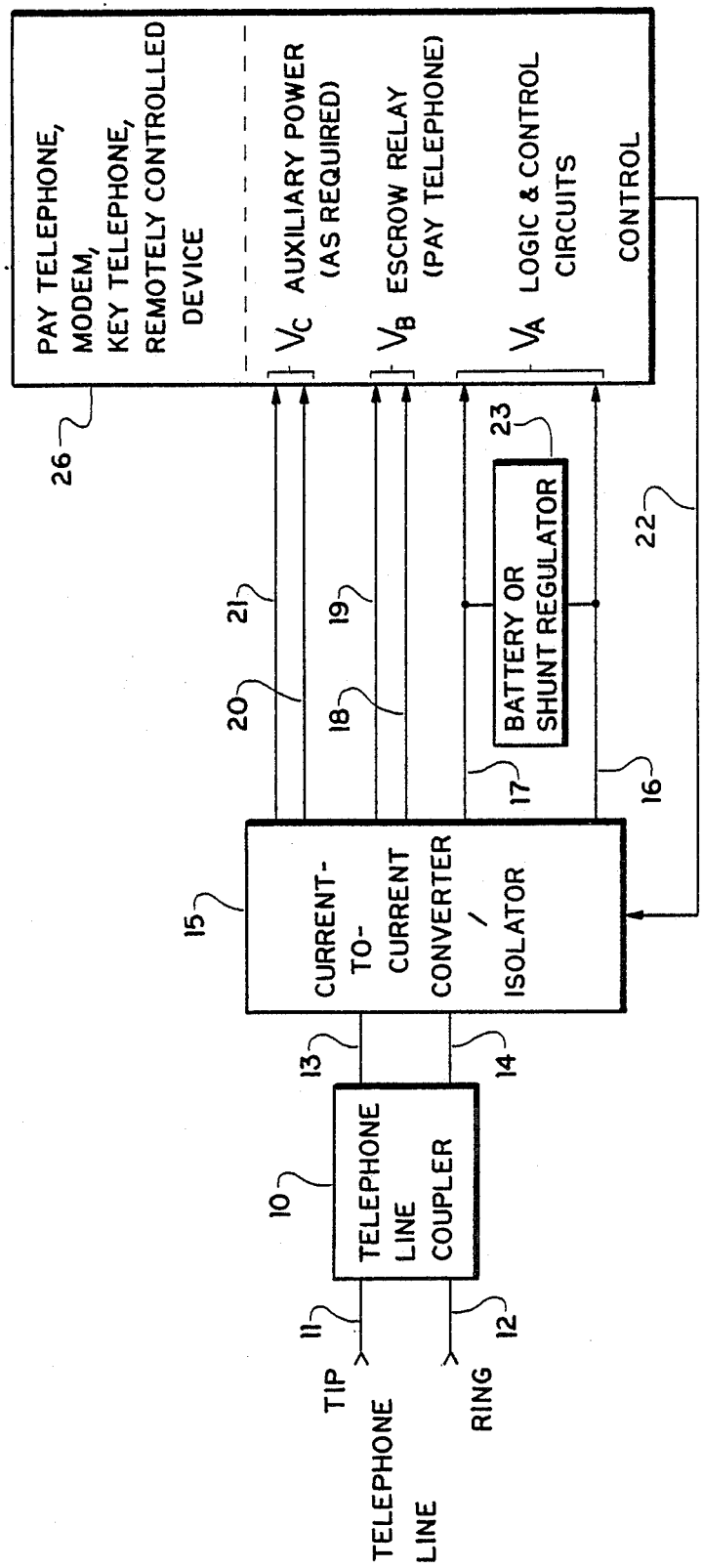
FIG. 1 is a block diagram illustrating the particular environment to which the present invention is adapted.

Refering to FIG. 1, telephone apparatus constructed in accordance with the present invention is shown, and includes a current-to-current converter/isolator (CCC/I) 15 and a telephone device 26, for example, a pay telephone, modem, key telephone, or remotely controlled device. Telephone lines 11 and 12 (also known as "tip" and "ring" lines) connect, through a telephone line coupler 10 and via lines 13 and 14, to the CCC/I 15. A battery or shunt regulator 23 is connected to output voltage $V_A$, which voltage is used to power the logic and control circuit of the telephone circuitry within device 26 through lines 16 and 17. Voltage $V_A$ can be considered the main voltage output because it provides power to the logic and control circuits in device 26. The purpose of the regulator is to establish the proper operating voltage for the logic and control circuits, and to establish the proper operating voltage for all other output voltages. CCC/I 15 provides more current than is needed by the telephone circuitry powered by voltage $V_A$ (and $V_B$ and $V_C$ if they are required). Excess current is consumed by the shunt regulator and is dissipated in the form of heat from the regulator. If a chargeable battery is used, the excess current will keep it charged. A battery is preferred for element 23 because it can provide immediate power to the logic and control circuits thereby allowing immediate generation of a dial tone when telephone device 26 is taken off-hook, and can maintain voltage on critical memory circuits within device 26 if required. The battery can also provide power to the logic and control circuits after the telephone line is disconnected.

Voltage $V_B$ appearing across lines 18 and 19 can be used to charge the escrow relay capacitor of a pay telephone. Voltage $V_C$ appearing across lines 20 and 21 provides a third voltage for telephone circuitry within device 26 that requires a voltage different from that provided by voltage outputs $V_A$ and $V_B$. Other voltages may be derived from CCC/I 15 as required. Control input 22 is generated in a known manner by telephone device 26 and may be used to alternately switch CCC/I 15 off and on as required for pulse dialing.

Figure 7:
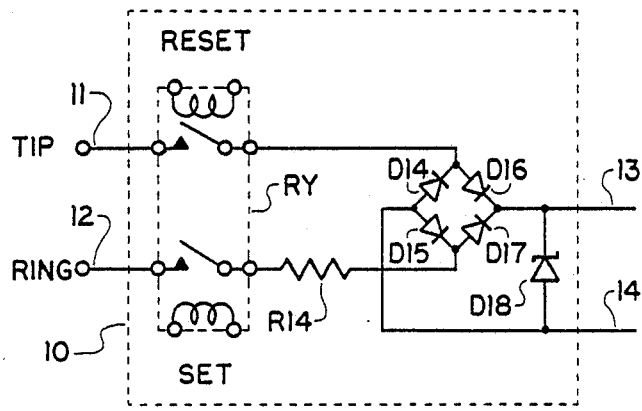
FIG. 7 is a schematic electrical circuit diagram of a portion of the block diagram of FIG. 1.

A telephone line coupler 10 provides the interface between telephone lines 11 and 12, and CCC/I 15 via lines 13 and 14. An example of such a coupler is shown in schematic form in FIG. 7. It has a known latching double-pole, single-throw relay, RY, with set and reset windings. In a known manner, voltage generated by telephone device 26 is momentarily applied to either winding to close or open the connection of the coupler to the telephone line, for example, when the telephone goes off or on hook. A full-wave bridge rectifier comprising diodes D14, D15, D16, and D17 insures that the voltage polarity on outputs 13 and 14 is always positive and negative respectively even if the tip and ring inputs 11 and 12 are reversed. Resistor R14 limits the peak current into the bridge rectifier and the zener diode, D18, limits the peak voltage on lines 13 and 14.

Figure 2:
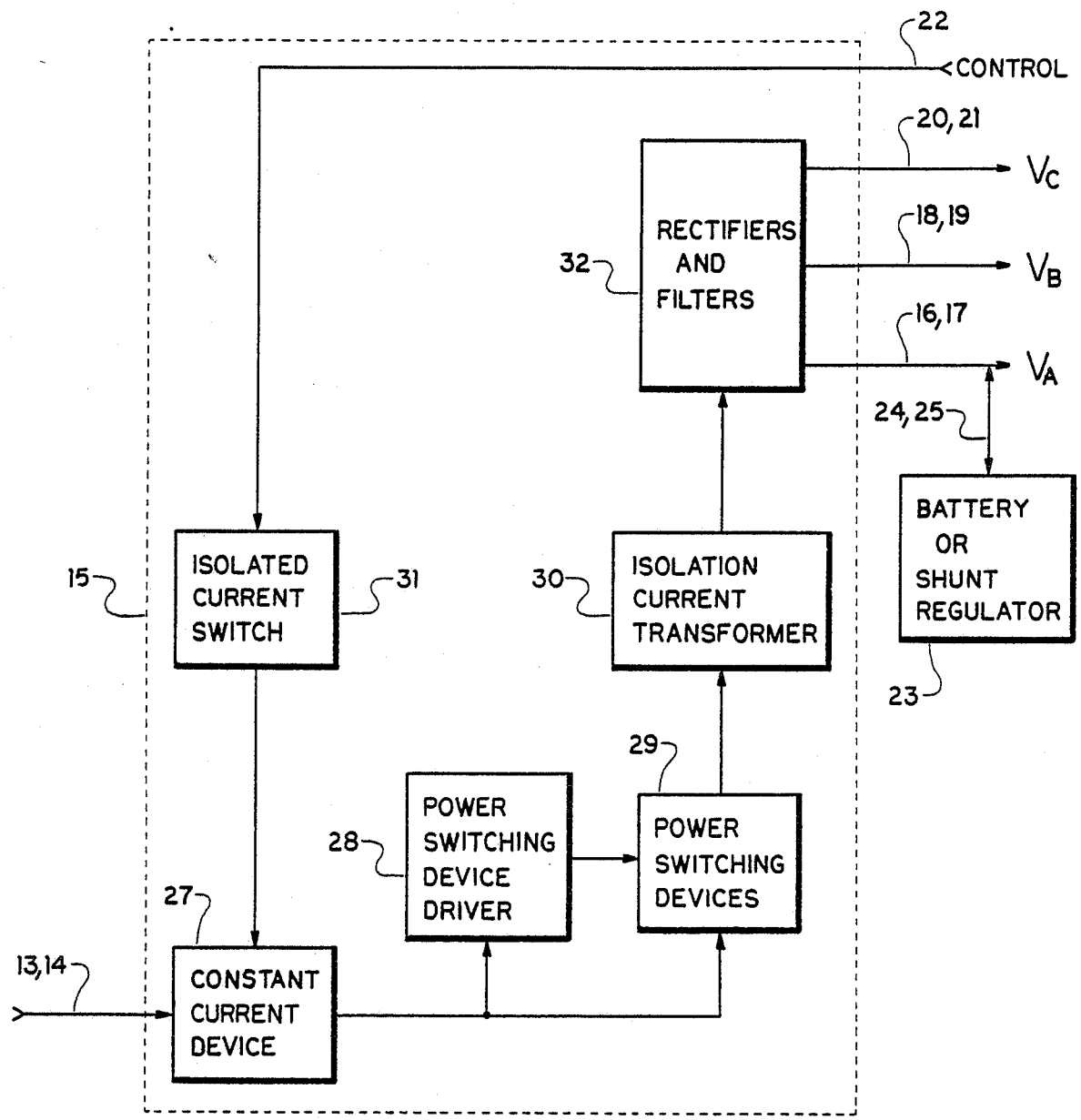
FIG. 2 is a block diagram of the circuitry of the present invention.
Figure 3:
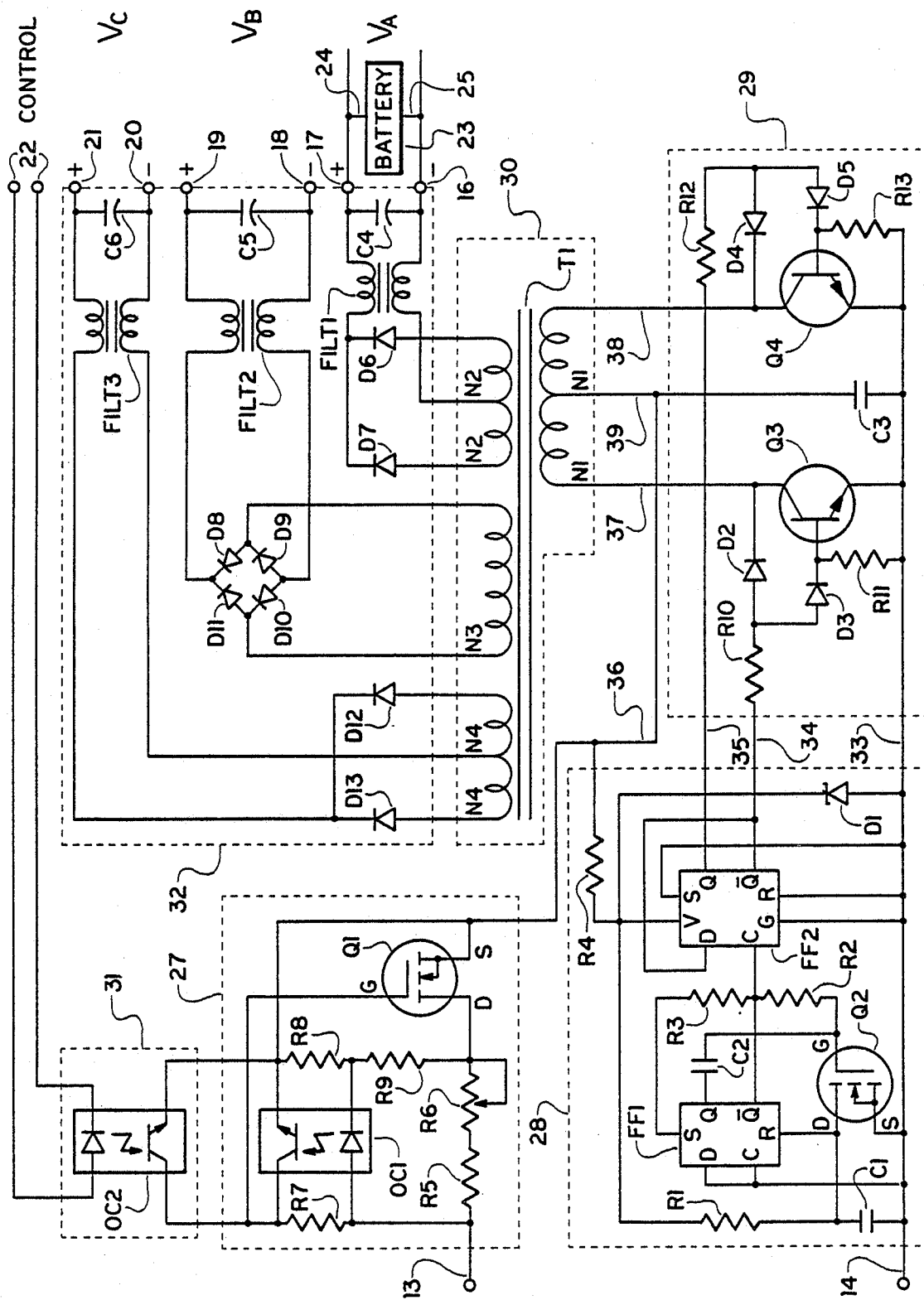
FIG. 3 is a schematic electrical circuit diagram of the circuitry of the current-to-current converter/isolator of the present invention.

A block diagram of CCC/I 15 is shown in FIG. 2, and a detailed schematic of the preferred embodiment of CCC/I 15 is shown in FIG. 3. The constant current device 27 controls the flow of current through the telephone lines 11 and 12, the telephone line coupler 10, lines 13 and 14, the power switching devices 29, and the isolation current transformer 30. In the preferred embodiment shown in FIG. 3, the d.c. current flows from positive input 13 through current sense resistor R5, potentiometer R6, MOSFET Q1, line 36 to winding N1 of transformer T1, lines 37 and 38, transistors Q3 and Q4, and back to negative input 14.

MOSFET transistor Q1 is turned on when the gate G is made more positive than the source S through resistor R7. As current increases, the voltage across resistor R5 and potentiometer R6 increases. When the voltage across resistor R5 and potentiometer R6 reaches a predetermined value, e.g., about one volt, current begins to flow through resistor R9 and through the light-emitting diode (LED) of optical coupler OC1. Light emitted by this LED causes the phototransistor in OC1 to turn on, thereby reducing the voltage between the gate and source of transistor Q1 and preventing the current from increasing further. Resistor R9 limits the current through the LED in OC1 and, along with resistor R8, compensates for current variations caused by variations in the voltage across lines 13 and 14. As the voltage across lines 13 and 14 increases, the current through R7 increases requiring greater light output from the LED for current control. R8 provides a current through the LED that increases as the voltage across lines 13 and 14 increases, and in effect maintains the current through transistor Q1 constant by turning the phototransistor in OC1 on more as the voltage increases. Another optical coupler OC2 (current switch 31) couples the control input 22 to transistor Q1. Current supplied to the LED of OC2 through control input 22 causes the phototransistor in OC2 to turn on, thereby connecting the gate of transistor Q1 to its source and turning it off. This cuts off all current flow through lines 13 and 14 except for a very small current (several hundred microamperes) through resistors R5, R6, R7, R8, and R9. In the preferred embodiment, potentiometer R6 is adjusted so that constant current device 27 passes 20 milliamperes.

Figure 8:
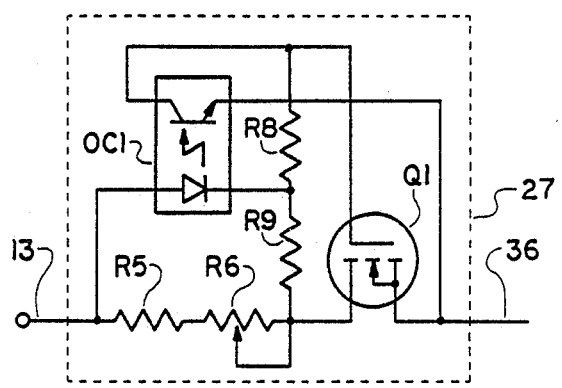

A variation of constant current device 27 is shown in FIG. 8. Resistor R7 is eliminated, and the gate of transistor Q1 is connected to resistor R8 and the phototransistor collector in OC1 exclusively. This circuit, though simpler, adds an additional one volt drop minimum between line 13 and the source of transistor Q1.

Transformer T1 provides power coupling and isolation between input lines 13 and 14 and outputs $V_A$, $V_B$, and $V_C$. Any one output winding may have a shunt regulator or a battery across its rectified output. This will establish the voltage across the winding for that output, and knowing the volts per turn established for a particular transformer core and bobbin, all other winding turns, voltages, and currents are then determined.

The input d.c. current is transformed into an a.c. current by power switching devices 29 and power switching device driver 28. The device driver 28 produces complementary switching signals on lines 34 and 35 and is powered from the voltage developed across zener diode D1. Power for diode D1 and flip-flops FF1 and FF2 is supplied through resistor R4 from line 36. The flip-flops are preferably D-type CMOS devices and are typically available, two to a package, in standard dual-in-line packages. For example, type 4013B dual D flip-flops available from Motorola, can be used.

Flip-flop FF1 is configured as an astable oscillator having a substantially constant frequency determined by resistor R1 and capacitor C1. When the voltage at reset input R of FF1 reaches its threshold value, FF1 resets and output $\overline{Q}$ of FF1 goes high. This turns on transistor Q2 which discharges capacitor C1 to ground. Resistor R2 and capacitor C2 provide a delaying action to transistor Q2 so Q2 does not turn on so fast that Q2 does not fully discharge capacitor C1. Resistor R3 couples output $\overline{Q}$ of FF1 to set input S of FF1. Resistor R2 is of sufficiently large value that it and the input capacitance of set input S of FF1 delays the set input slightly, thus stabilizing the oscillator so that it will operate over the full operating voltage range of FF1 with minimum variation in frequency. The $\overline{Q}$ output of FF1 drives the clock input C of FF2. The clock (C) and data (D) inputs of FF1 are unused and are grounded so they will not affect the operation of the oscillator. The data input D of FF2 is connected to the $\overline{Q}$ output of FF2 so the Q and $\overline{Q}$ outputs of FF2 will alternate between high and low with each clock pulse. These alternations occur simultaneously in order to satisfy a requirement of power switching device 29 that they be switched simultaneously and with equal time intervals between alternations. Thus, outputs Q and $\overline{Q}$ of FF1 provide complementary switching signals, each having a substantially constant frequency, and each with a duty cycle of substantially 50%. In the preferred embodiment, timing components R1 and C1 are chosen to produce a switching frequency of approximately 25 kHz.

One embodiment of power switching devices 29 is shown in FIG. 3. Diodes D2, D3, D4, and D5 prevent transistors Q3 and Q4 from saturating. This greatly reduces electrical noise generation and increases efficiency. Resistors R11 and R13 provide turn-off current to the bases of transistors Q3 and Q4, while resistors R10 and R12 provide turn-on current. Capacitor C3 eliminates electrical noise on line 36 that is generated by the switching action of transistors Q3 and Q4.

Figure 4:
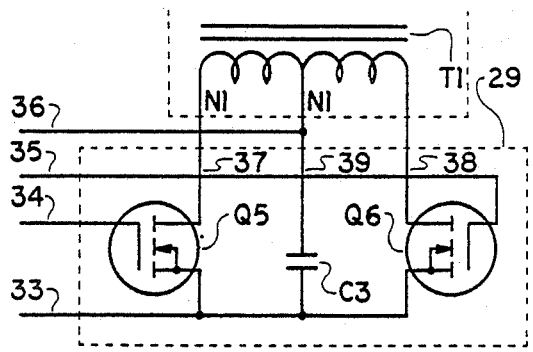
FIGS. 4, 5, 6, and 8 are schematic electrical circuit diagrams illustrating various embodiments of portions of the circuitry of FIG. 3.
Figure 6:
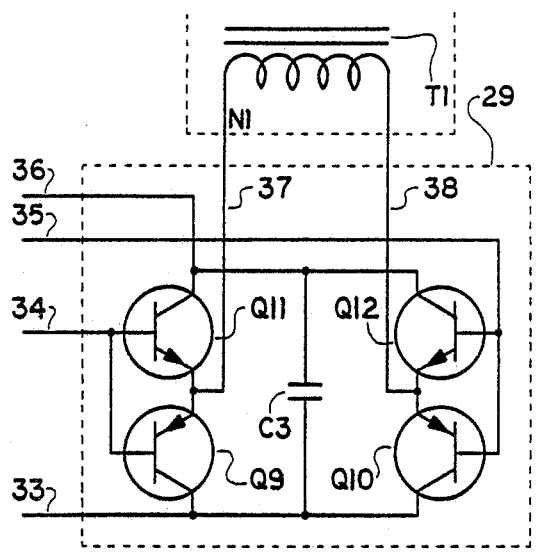
Figure 5:
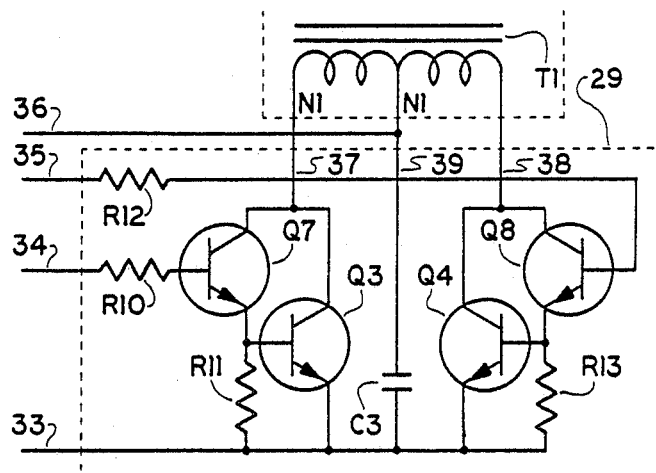

Other embodiments of the power switching devices are shown in FIG. 4, FIG. 5, and FIG. 6. In FIG. 4, a MOSFET transistor Q5 replaces bipolar transistor Q3, diodes D2 and D3, and resistors R10 and R11, shown in FIG. 3. Transistor Q6 in FIG. 4 replaces transistor Q4, diodes D4 and D5 and resistors R12 and R13 in a similar fashion. In FIG. 5, diodes D2, D3, D4, and D5 shown in FIG. 3 are replaced by transistors Q7 and Q8. The embodiment in FIG. 6 eliminates the need for a center-tapped winding on the primary of transformer T1. When using the power switching devices 29 of FIG. 6, Zener diode D1 and resistor R4 are eliminated from the circuit of FIG. 3, and a direct connection between the power supply voltage input of FF1 and FF2, V, is made to line 36. This will allow the Q and $\overline{Q}$ outputs of FF2 on lines 34 and 35 to alternate between the voltage on line 36 and line 14 and consequently to alternate the voltage on transformer primary winding N1 of FIG. 6 by the same amount.

The output or outputs of transformer T1 are applied to rectifiers and filters (32 of FIG. 3). Shown are two full-wave center-tapped bridge rectifiers, D6 and D7, D12 and D13, and a full-wave bridge rectifier, D8, D9, D10, and D11. The output of secondary winding N2 is rectified by diodes D6 and D7, filtered by coupled-inductor FILT1 and capacitor C4, and connected to a rechargeable battery 23. During operation, the voltages on all windings increase in value until the voltage on secondary winding N2 forward-biases diodes D6 and D7 and supplies current to battery 23. At that point, all voltage rises on all windings cease and each winding will have a voltage as determined by the turn ratios of transformer T1.

Secondary windings N3 and N4 and their associated rectifiers and filters may be added as needed. Secondary winding N3, as configured, will typically provide an output of 112 volts a.c. which, when rectified and filtered, will produce approximately 110 volts d.c. as an output. This output will typically be used to charge a 50 microfarad escrow relay capacitor to 110 volts d.c. within two seconds after the telephone is taken off hook. If a third voltage is needed, another secondary winding, N4, is added. It may be a center-tapped winding as shown.

The embodiment of CCC/I 15 shown in schematic form in FIG. 3 was built and successfully operated. It powered a pay telephone device having circuitry which required more current than the telephone line alone could provide. The variations shown in FIGS. 4, 5, 6, and 8 were also successfully tested. Efficiency of the current-to-current converter used in the present invention was measured as high as 90 to 95 percent.

Other variations and modifications of this invention will occur to those skilled in the art without departing from the spirit or scope of this invention. By way of example, other types of devices may be substituted for the power switching devices 29, and the power switching device driver 28. For example, a solid-state integrated circuit, or several solid-state integrated circuits may be substituted to decrease the number of discrete parts. A discrete device may also be substituted for the constant current device 27. Thus, this detailed description is offered by way of example and not limitation.

What is claimed is:

1. A telephone apparatus powered directly from a telephone line, comprising:
   a telephone device;
   means, connectable with first and second conductors of a telephone line, for limiting current drawn from said telephone line, and for producing a constant current output;
   a transformer including a primary winding and at least one secondary winding connected to said telephone device, said at least one secondary winding being electrically isolated from said primary winding;
   switching means, connected to said constant current output, for alternately connecting and disconnecting said constant current output to and from said primary winding at a substantially constant frequency and duty cycle; and
   means connected across one of said at least one secondary winding for regulating voltages on all windings of said transformer and for producing regulated output voltages corresponding to respective ones of said at least one secondary winding.

2. A telephone apparatus as recited in claim 1, wherein said means for limiting current comprises:
   a MOSFET transistor including gate, drain and source terminals, said source terminal being connected to said constant current output;
   first resistor means having a first terminal connectable to said first conductor of said telephone line and a second terminal connected to said drain terminal;
   optical isolator means including a light emitting diode and a phototransistor, an anode of said light emitting diode being connected to said first terminal of said first resistor means and a cathode of said light emitting diode being connected to said drain terminal through a second resistor means and being connected to said source terminal through a third resistor means, said phototransistor including a collector terminal connected to said gate terminal, and an emitter terminal connected to said source terminal.

3. A telephone apparatus as recited in claim 2, wherein said first resistor means includes an adjustable potentiometer for varying an amount of current produced by said constant current output.

4. A telephone apparatus as recited in claim 1, wherein said means for limiting current further comprises;
   a MOSFET transistor including gate, drain and source terminals, said source terminal being connected to said constant current output;
   first resistor means having a first terminal connectable to said first conductor of said telephone line and a second terminal connected to said drain terminal;
   optical isolator means including a light emitting diode and a phototransistor, an anode of said light emitting diode being connected to said first terminal of said first resistor means and a cathode of said light emitting diode being connected to said drain terminal through a second resistor means and being connected to said constant current output through a third resistor means, said phototransistor including a collector terminal connected to said gate terminal and an emitter terminal connected to said constant current output; and
   fourth resistor means connected intermediate said anode of said light emitting diode and said collector terminal of said phototransistor.

5. A telephone apparatus as recited in claim 4, wherein said means for limiting current further comprises on/off control means, comprising:
   second optical isolator means including a phototransistor having a collector connected to said gate terminal and an emitter connected to said constant current output, and a light emitting diode having an anode and cathode connectable to a control signal for turning said means for limiting current on and off.

6. A telephone apparatus as recited in claim 4, wherein said first resistor means includes an adjustable potentiometer for adjusting a magnitude of said constant current output.

7. A telephone apparatus as recited in claim 1, wherein said primary winding of said transformer includes a center tap and two end taps, said center tap being connected to said constant current output; and
   wherein said switching means includes first and second power switching devices connected to respective end taps of said primary winding.

8. A telephone apparatus as recited in claim 7, wherein said switching means further comprises;
   astable oscillator means, for producing first and second complementary switching signals, each having a substantially constant frequency and a duty cycle of substantially 50%;
   said first switching signal controlling said first power switching device, and said second switching signal controlling said second power switching device, whereby said constantcurrent output is alternately applied between said center tap and said first and second ends of said primary winding.

9. A telephone apparatus as recited in claim 8, wherein said astable oscillator means comprises:
   a first and a second flip-flop, and a MOSFET transistor including gate, drain and source terminals;
   said first flip-flop and said MOSFET configured as a clock source, a reset terminal of said first flip-flop being connected to said constant current output through a first resistor means, being connected to said drain terminal, and being connected to said source terminal through a first capacitor means;
   a complemented output of said first flip-flop being connected to a set input of said first flip-flop through a second resistor means and being connected to said gate terminal through a third resistor means;
   an uncomplemented output of said first flip-flop being connected to said gate terminal through a second capacitor means;
   said source terminal being connectable to said second conductor of said telephone line; and
   a clock input of said second flip-flop being connected to said complemented output of said first flip-flop, and a data input of said second flip-flop being connected to a complemented output of said second flip-flop, said complemented output and an uncomplemented output of said second flip-flop producing said first and second complementary switching signals.

10. A telephone apparatus as recited in claim 8, wherein said first and second switching devices each comprises:
- a bipolar transistor including base, collector and emitter terminals, said emitter terminal being connectable to said second conductor of said telephone line, and said collector terminal being connected to a respective end tap of said primary winding;
- first resistor means connected between said base terminal and said emitter terminal;
- second resistor means connected to a respective one of said first and second complementary switching signals, and connected to anodes of first and second diodes, a cathode of said first diode being connected to said collector terminal and a cathode of said second diode being connected to said base terminal.

11. A telephone apparatus as recited in claim 8, wherein said first and second switching devices each comprises:
- a MOSFET transistor having gate, drain and source terminals, said gate terminal being connected to a respective one of said first and second switching signals, said drain terminal being connected to a respective end tap of said primary winding, and said source terminal being connectable to said second conductor of said telephone line.

12. A telephone apparatus as recited in claim 8, wherein said first and second switching devices each comprises:
- a first and second bipolar transistor, each having a base, collector and emitter terminal, each collector terminal being connected together and to a respective end tap of said primary winding, said emitter terminal of said first transistor being connected to said base terminal of said second transistor, and said emitter terminal of said second transistor being connectable to said second conductor of said telephone line;
- a first resistor means connected intermediate a respective one of said complementary switching signals and said base terminal of said first transistor; and
- second resistor means connected intermediate said base and emitter terminals of said second transistor.

13. A telephone apparatus as recited in claim 1, wherein said primary winding of said transformer has first and second ends, and wherein said switching means includes first and second power switching devices connected to a respective one of said first and second ends.

14. A telephone apparatus as recited in claim 13, wherein said switching means further comprises:
- astable oscillator means, for producing first and second complementary switching signals, each having a substantially constant frequency and a duty cycle of substantially 50%;
- said first switching signal controlling said first power switching device, and said second switching signal controlling said second power switching device, whereby said constantcurrent output is alternately applied between said first and second ends of said primary winding.

15. A telephone apparatus as recited in claim 14, wherein said astable oscillator means comprises:
- a first and a second flip-flop, and a MOSFET transistor including gate, drain and source terminals;
- said first flip-flop and said MOSFET transistor configured as a clock source, a reset terminal of said first flip-flop being connected to said constant current output through a first resistor means, being connected to said drain terminal, and being connected to said source terminal through a first capacitor means;
- a complemented output of said first flip-flop being connected to a set input of said first flip-flop through a second resistor means and being connected to said gate terminal through a third resistor means;
- an uncomplemented output of said first flip-flop being connected to said gate terminal through a second capacitor means;
- said source terminal being connectable to said second conductor of said telephone line; and
- a clock input of said second flip-flop being connected to said complemented output of said first flip-flop, and a data input of said second flip-flop being connected to a complemented output of said second flip-flop, said complemented output and an uncomplemented output of said second flip-flop producing said first and second complementary switching signals.

16. A telephone apparatus as recited in claim 15, wherein said first and second power switching device each comprise:
- a bipolar NPN transistor having a collector connected to said constant current output, a base connected to a respective one of said first and second complementary switching signals, and an emitter connected to a respective end of said primary winding; and
- a bipolar PNP transistor having a collector connectable to said second conductor of said telephone line, a base connected to said base of said PNP transistor, and an emitter connected to said emitter of said PNP transistor.

17. A telephone apparatus as recited in claim 1, wherein each of said at least one secondary winding is connected to a respective rectifying and filtering circuit for producing a respective regulated and filtered dc output voltages for each of said at least one secondary winding.

18. A telephone apparatus as recited in claim 1, wherein said means for regulating voltages is a shunt regulator connected to one of said at least one secondary winding.

19. A telephone apparatus as recited in claim 18, wherein a rectifying and filtering circuit is connected intermediate said one of said at least one secondary winding and said shunt regulator.

20. A method of powering a telephone device directly from telephone lines without external power, including the steps of:
- providing an isolation transformer having a primary winding and at least one secondary winding;
- limiting a current drawn from said telephone lines to produce a constant current output;
- alternately applying said constant current output to said primary winding at a substantially constant frequency and substantially constant duty cycle;
- regulating voltages on all windings of said transformer by regulating a voltage on one of said at least one secondary winding;
- applying regulated voltages of each of said at least one secondary winding to the telephone device to power the telephone device.

21. A method as recited in claim 20, wherein said step of alternately applying further includes the steps of:

applying said constant current output to a first half of said primary winding for successive first time periods; and applying said constant current output to a second half of said primary winding for successive second time periods intermediate said first time periods, said first and second time periods being substantially equal.

22. A method as recited in claim 20, wherein said step of alternately applying further includes the steps of:

applying said constant current output to said primary winding with a first polarity during successive first time periods; and applying said constant current output to said primary winding with a second polarity during successive second time periods intermediate said first time periods, said first and second time periods being substantially equal.

23. A telephone apparatus powered directly from a telephone line, comprising:

a telephone device;

means, connectable with first and second conductors of a telephone line, for limiting current drawn from said telephone line, and for producing a constant current output;

a transformer including a primary winding and at least one secondary winding connected to said telephone device, said at least one secondary winding being electrically isolated from said primary winding;

switching means, connected to said constant current output, for alternately connecting and disconnecting said constant current output to and from said primary winding at a substantially constant frequency and duty cycle; and means, including a chargeable battery, connected across one of said at least one secondary winding for regulating voltages on all windings of said transformer and for producing regulated output voltages corresponding to respective ones of said at least one secondary winding.

24. A method of powering a telephone device directly from telephone lines without external power, including the steps of:

providing an isolation transformer having a primary winding and at least one secondary winding;

limiting a current drawn from said telephone lines to produce a current limited output;

alternately applying said current limited output to said primary winding at a substantially constant duty cycle;

regulating voltages on all windings of said transformer by regulating a voltage on one of said at least one secondary winding by storing energy in a battery connected across said one of said at least one secondary winding;

applying regulated voltages of each of said at least one secondary winding to the telephone device to power the telephone device.

25. A telephone apparatus as recited in claim 23, wherein a rectifying and filtering circuit is connected intermediate said one of said at least one secondary winding and said chargeable battery.

* * * * *